United States Patent
Bokare et al.

(10) Patent No.: US 10,326,733 B2
(45) Date of Patent: Jun. 18, 2019

(54) SYSTEMS AND METHODS FOR FACILITATING SINGLE SIGN-ON FOR MULTIPLE DEVICES

(71) Applicant: Symantec Corporation, Mountain View, CA (US)

(72) Inventors: Prasad Bokare, Sunnyvale, CA (US); Gary Krall, Saratoga, CA (US); Nicolas Popp, Los Altos Hills, CA (US); Kunal Agarwal, San Jose, CA (US); Tushar Goyal, Bangalore (IN); Srinath Venkataramani, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 366 days.

(21) Appl. No.: 15/041,040

(22) Filed: Feb. 11, 2016

(65) Prior Publication Data

US 2017/0195429 A1    Jul. 6, 2017

(51) Int. Cl.
  *G06F 15/16* (2006.01)
  *H04L 29/06* (2006.01)
  *H04L 29/08* (2006.01)
(52) U.S. Cl.
  CPC .............. *H04L 63/00* (2013.01); *H04L 67/12* (2013.01)
(58) Field of Classification Search
  CPC ......... H04L 29/08; H04L 63/00; H04L 63/20; H04L 67/12; H04L 67/24; H04L 67/146; H04L 67/306; H04L 63/0815
  USPC ........................................................ 709/227
  See application file for complete search history.

(56) References Cited

U.S. PATENT DOCUMENTS

| | | | |
|---|---|---|---|
| 3,740,718 A | 6/1973 | Melvin, Jr. | |
| 3,744,043 A | 7/1973 | Walden et al. | |
| 5,867,578 A | 2/1999 | Brickell et al. | |
| 6,100,811 A | 8/2000 | Hsu et al. | |

(Continued)

FOREIGN PATENT DOCUMENTS

| | | |
|---|---|---|
| AU | 2013371346 B2 | 3/2017 |
| CA | 2 895 265 C | 2/2018 |

(Continued)

OTHER PUBLICATIONS

"Symantec Validation and ID Protection Service", http://www.symantec.com/vip-authentication-service/, as accessed Nov. 6, 2015, Symantec Corporation, (Feb. 10, 2014).

(Continued)

*Primary Examiner* — Phuoc H Nguyen
(74) *Attorney, Agent, or Firm* — FisherBroyles, LLP

(57) ABSTRACT

The disclosed computer-implemented method for facilitating single sign-on for multiple devices may include (1) establishing a login session for a user account, (2) in response to establishing the login session, providing, to a device associated with the user account, a session token for the user account, (3) receiving, from at least one client, a request to access resources associated with the user account, (4) determining that the associated device possesses the session token for the user account, and (5) in response to determining that the associated device possesses the session token, providing, to the client, access to the resources associated with the user account. Various other methods, systems, and computer-readable media are also disclosed.

20 Claims, 6 Drawing Sheets

(56) References Cited

U.S. PATENT DOCUMENTS

| | | | |
|---|---|---|---|
| 6,970,183 B1 | 11/2005 | Monroe | |
| 7,925,751 B1* | 4/2011 | Bolinger | G06F 17/30067 709/219 |
| 8,261,976 B1 | 9/2012 | Block et al. | |
| 8,316,421 B2 | 11/2012 | Etchegoyen | |
| 8,620,841 B1 | 12/2013 | Filson et al. | |
| 8,719,590 B1 | 5/2014 | Faibish et al. | |
| 8,726,405 B1 | 5/2014 | Bailey et al. | |
| 8,925,037 B2 | 12/2014 | Marino et al. | |
| 9,154,466 B2 | 10/2015 | Sobel et al. | |
| 9,171,178 B1 | 10/2015 | Banerjee | |
| 9,202,173 B1 | 12/2015 | Dotan et al. | |
| 9,218,468 B1 | 12/2015 | Rappaport | |
| 9,282,435 B2 | 3/2016 | Ward et al. | |
| 9,396,599 B1 | 7/2016 | Malhotra | |
| 9,661,483 B2 | 5/2017 | Bastianelli | |
| 9,697,660 B1 | 7/2017 | Sokolov et al. | |
| 9,817,958 B1 | 11/2017 | McCorkendale | |
| 10,116,513 B1 | 10/2018 | Sundaram | |
| 2002/0059532 A1 | 5/2002 | Ata et al. | |
| 2002/0080938 A1 | 6/2002 | Alexander, III et al. | |
| 2003/0172280 A1 | 9/2003 | Scheidt et al. | |
| 2003/0216143 A1 | 11/2003 | Roese et al. | |
| 2004/0143556 A1 | 7/2004 | Graubart et al. | |
| 2004/0153671 A1 | 8/2004 | Schuyler et al. | |
| 2005/0097320 A1 | 5/2005 | Golan et al. | |
| 2006/0031682 A1 | 2/2006 | Sakai et al. | |
| 2006/0082439 A1 | 4/2006 | Bazakos et al. | |
| 2006/0164282 A1 | 7/2006 | Duff et al. | |
| 2006/0210167 A1 | 9/2006 | Inoue et al. | |
| 2007/0171921 A1* | 7/2007 | Wookey | G06F 3/1415 370/401 |
| 2007/0210910 A1 | 9/2007 | Norstrom et al. | |
| 2008/0018458 A1 | 1/2008 | Derrick et al. | |
| 2009/0198112 A1 | 8/2009 | Park et al. | |
| 2010/0005526 A1 | 1/2010 | Tsuji et al. | |
| 2010/0014721 A1 | 1/2010 | Steinberg et al. | |
| 2010/0024042 A1 | 1/2010 | Motahari et al. | |
| 2010/0083385 A1 | 4/2010 | Uchida | |
| 2010/0205667 A1 | 8/2010 | Anderson et al. | |
| 2010/0281254 A1 | 11/2010 | Carro | |
| 2010/0299002 A1 | 11/2010 | Abdallah et al. | |
| 2010/0302143 A1 | 12/2010 | Spivack | |
| 2010/0325712 A1 | 12/2010 | Kakuta et al. | |
| 2011/0206285 A1 | 8/2011 | Hodge et al. | |
| 2011/0219423 A1 | 9/2011 | Aad et al. | |
| 2011/0219427 A1* | 9/2011 | Hito | G06F 21/00 726/3 |
| 2011/0247069 A1 | 10/2011 | Slater | |
| 2011/0252131 A1 | 10/2011 | Karaoguz | |
| 2011/0293095 A1 | 12/2011 | Ben Ayed | |
| 2011/0321137 A1 | 12/2011 | Iida et al. | |
| 2011/0321143 A1 | 12/2011 | Angaluri et al. | |
| 2012/0011559 A1 | 1/2012 | Miettinen et al. | |
| 2012/0044089 A1 | 2/2012 | Yamold et al. | |
| 2012/0072719 A1 | 3/2012 | Hui et al. | |
| 2012/0079576 A1 | 3/2012 | Han et al. | |
| 2012/0139755 A1 | 6/2012 | Ginsberg | |
| 2012/0181333 A1 | 7/2012 | Krawczewicz et al. | |
| 2012/0185910 A1 | 7/2012 | Miettinen et al. | |
| 2012/0190386 A1 | 7/2012 | Anderson | |
| 2012/0198570 A1 | 8/2012 | Joa et al. | |
| 2012/0239929 A1 | 9/2012 | Newman et al. | |
| 2012/0243687 A1 | 9/2012 | Li et al. | |
| 2012/0246739 A1 | 9/2012 | Mebed | |
| 2012/0331527 A1 | 12/2012 | Walters et al. | |
| 2013/0010966 A1 | 1/2013 | Li et al. | |
| 2013/0097709 A1 | 4/2013 | Basavapatna et al. | |
| 2013/0102283 A1 | 4/2013 | Lau et al. | |
| 2013/0103482 A1 | 4/2013 | Song et al. | |
| 2013/0104203 A1 | 4/2013 | Davis et al. | |
| 2013/0151617 A1 | 6/2013 | Davis | |
| 2013/0159876 A1 | 6/2013 | Narasimhan et al. | |
| 2013/0177157 A1 | 7/2013 | Li et al. | |
| 2013/0197998 A1 | 8/2013 | Buhrmann et al. | |
| 2013/0227712 A1 | 8/2013 | Salem et al. | |
| 2013/0262873 A1 | 10/2013 | Read et al. | |
| 2013/0275498 A1 | 10/2013 | Cheng et al. | |
| 2013/0290201 A1 | 10/2013 | Rodriguez Carrillo | |
| 2013/0298248 A1 | 11/2013 | Boldrev et al. | |
| 2013/0318580 A1 | 11/2013 | Gudlavenkatasiva et al. | |
| 2013/0318625 A1 | 11/2013 | Fan | |
| 2013/0340089 A1 | 12/2013 | Steinberg et al. | |
| 2014/0007225 A1 | 1/2014 | Gay et al. | |
| 2014/0025485 A1 | 1/2014 | Niemeijer et al. | |
| 2014/0040137 A1 | 2/2014 | Carlson et al. | |
| 2014/0067679 A1 | 3/2014 | O'Reilly et al. | |
| 2014/0068702 A1* | 3/2014 | Hyndman | G06F 21/41 726/1 |
| 2014/0082715 A1* | 3/2014 | Grajek | G06F 17/30876 726/8 |
| 2014/0112537 A1 | 4/2014 | Frank et al. | |
| 2014/0123255 A1 | 5/2014 | Etchegoyen | |
| 2014/0130127 A1 | 5/2014 | Toole et al. | |
| 2014/0173700 A1 | 6/2014 | Awan et al. | |
| 2014/0189786 A1 | 7/2014 | Castro et al. | |
| 2014/0201377 A1* | 7/2014 | Kadishay | H04L 65/1069 709/227 |
| 2014/0282870 A1 | 9/2014 | Markwordt et al. | |
| 2014/0380444 A1 | 12/2014 | Kelley | |
| 2015/0019873 A1 | 1/2015 | Hagemann | |
| 2015/0069219 A1 | 3/2015 | Klein et al. | |
| 2015/0082399 A1 | 3/2015 | Wu et al. | |
| 2015/0089231 A1 | 3/2015 | Oxford et al. | |
| 2015/0237038 A1 | 8/2015 | Grajek et al. | |
| 2015/0288687 A1 | 10/2015 | Heshmati et al. | |
| 2015/0324559 A1 | 11/2015 | Boss et al. | |
| 2015/0363986 A1 | 12/2015 | Hoyos et al. | |
| 2016/0007083 A1 | 1/2016 | Gurha | |
| 2016/0012655 A1 | 1/2016 | Hanson et al. | |
| 2016/0044001 A1 | 2/2016 | Pogorelik et al. | |
| 2016/0057110 A1 | 2/2016 | Li et al. | |
| 2016/0063640 A1 | 3/2016 | Ellingsworth | |
| 2016/0068264 A1 | 3/2016 | Ganesh et al. | |
| 2016/0082926 A1 | 3/2016 | Mouser et al. | |
| 2016/0087950 A1 | 3/2016 | Barbir et al. | |
| 2016/0112522 A1 | 4/2016 | Abell et al. | |
| 2016/0112871 A1 | 4/2016 | White | |
| 2016/0132684 A1 | 5/2016 | Barbas et al. | |
| 2016/0140257 A1 | 5/2016 | Vega | |
| 2016/0164922 A1 | 6/2016 | Boss et al. | |
| 2016/0165650 A1 | 6/2016 | Kim et al. | |
| 2016/0165651 A1 | 6/2016 | Pathuri et al. | |
| 2016/0212109 A1 | 7/2016 | Hird | |
| 2016/0241390 A1 | 8/2016 | Harris et al. | |
| 2016/0316449 A1 | 10/2016 | Pitt et al. | |
| 2016/0358441 A1 | 12/2016 | Mittleman et al. | |
| 2017/0053280 A1 | 2/2017 | Lishok et al. | |
| 2017/0083345 A1 | 3/2017 | Sol | |
| 2017/0163666 A1 | 6/2017 | Venkatramani et al. | |
| 2017/0255940 A1 | 9/2017 | Kohli | |
| 2018/0027517 A9 | 1/2018 | Noonan | |
| 2018/0103021 A1 | 4/2018 | Arunkumar et al. | |
| 2018/0211464 A1 | 7/2018 | Kusens et al. | |
| 2018/0212976 A1 | 7/2018 | Arunkumar et al. | |
| 2018/0249398 A1 | 8/2018 | Hillary et al. | |

FOREIGN PATENT DOCUMENTS

| | | |
|---|---|---|
| CN | 101950332 A | 1/2011 |
| CN | 202795383 U | 3/2013 |
| CN | 103354931 A | 10/2013 |
| CN | 105874464 B | 1/2019 |
| EP | 1 703 431 A2 | 9/2006 |
| EP | 2 941 733 A1 | 11/2015 |
| EP | 3 087 531 A1 | 11/2016 |
| EP | 3166086 A1 | 5/2017 |
| JP | 2006-259930 A | 9/2006 |
| JP | 2007-304834 A | 11/2007 |
| JP | 2007293062 A | 11/2007 |
| JP | 2009-086891 A | 4/2009 |
| JP | 2009140051 A | 6/2009 |
| JP | 2010128778 A | 5/2010 |
| JP | 2011-004214 A | 1/2011 |

(56) References Cited

FOREIGN PATENT DOCUMENTS

| | | |
|---|---|---|
| JP | 2011-134137 A | 7/2011 |
| JP | 2012-235424 A | 11/2012 |
| JP | 2012-248027 A | 12/2012 |
| JP | 2013-246465 A | 12/2013 |
| JP | 2014-086865 A | 5/2014 |
| JP | 2016-503208 A | 2/2016 |
| JP | 6205062 B2 | 9/2017 |
| JP | 6314267 B2 | 4/2018 |
| WO | WO 2012/162009 A1 | 11/2012 |
| WO | 2013/101215 A1 | 7/2013 |
| WO | 2014/107435 A1 | 7/2014 |
| WO | 2015/100192 A1 | 7/2015 |

OTHER PUBLICATIONS

"Symantec Identity Access Manager", https://www.symantec.com/identity-access-manager/, as accessed Nov. 6, 2015, Symantec Corporation, (Nov. 7, 2014).
C., Neuman et al., "The Kerberos Network Authentication Service (V5)", https://tools.ietf.org/html/rfc4120, as accessed Nov. 6, 2015, Request for Comments: 4120, (Jul. 2005).
C., Rigney et al., "Remote Authentication Dial in User Service (RADIUS)", https://tools.ietf.org/html/rfc2865, as accessed Nov. 6, 2015, Request for Comments: 2865, (Jun. 2000).
"Microsoft NTLM", https://msdn.microsoft.com/en-us/library/windows/desktop/aa378749(v=vs.85).aspx, as accessed Nov. 6, 2015, (Nov. 12, 2011).
"Microsoft Negotiate", https://msdn.microsoft.com/en-us/library/windows/desktop/aa378748(v=vs.85).aspx. as accessed Nov. 6, 2015, (Nov. 13, 2011).
"Kerberos: The Network Authentication Protocol", http://web.mit.edu/kerberos/, as accessed Nov. 6, 2016, (Jan. 28, 1999).
Fake GPS Location app, https://play.google.com/store/apps/details?id=com.lexa.fakegps&hl=en, as accessed Feb. 23, 2017, Lexa Tools.
How SUPL Reveals My Identity and Location to Google When I Use GPS, http://mobilesociety.typepad.com/mobile_life/2014/08/supl-reveals-my-identity-and-location-to-google.html, published Aug. 31, 2014, Mobilesociety.
Assisted GPS, https://en.wikipedia.org/wiki/Assisted_GPS, as accessed Feb. 24, 2017, Wikipedia.
Lei Gu, et al; Systems and Methods for Enforcing Access-Control Policies; U.S. Appl. No. 15/194,403, filed Jun. 27, 2016.
HomeNews—WiFi can be used to count people with or without electronic gadgets; https://www.rt.com/news/266188-wifi-signal-human-density/; as accessed on Jun. 21, 2016; Jun. 10, 2015.
Ali et al.; Keystroke Recognition Using WiFi Signals; https://www.sigmobile.org/mobicom/2015/papers/p90-aliA.pdf; Sep. 7, 2015.
iRobot's Roomba 980 Maps Your Home Via Camera and Takes Smartphone Commands; http://blogs.wsj.com/personal-technology/2015/09/16/irobots-roomba-980-maps-your-home-via-camera-and-takes-smartphone-commands/; as accessed on Jun. 21, 2016; Sep. 16, 2015.
Microsoft Hololens; https://www.microsoft.com/microsoft-hololens/en-us; as accessed on Jun. 21, 2016.
Bruce McCorkendale, et al; Systems and Methods for Constructing a Volumetric Model of a Space from a Constellation of Sensing Devices; U.S. Appl. No. 14/833,655, filed Aug. 24, 2015.
Daniel Marino, et al; Systems and Methods for Enforcing Data-Loss-Prevention Policies Using Mobile Sensors; U.S. Appl. No. 13/733,131, filed Jan. 2, 2013.
Devicelock; Preventing Devastating Data Leaks by Securing the Endpoints of Your Network; http://www.devicelock.com/products/, as accessed on Sep. 10, 2012.
Konstantinos Kotis et al.; An ontology for the automated deployment of applications in heterogeneous IoT environments; http://www.semantic-web-journal.net/sites/default/files/swj247_0.pdf, as accessed Jun. 25, 2015; Semantic Web Journal; Feb. 13, 2012.

OMA Device Management; http://openmobilealliance.org/about-oma/work-program/device-management/, as accessed Jun. 25, 2015; Jan. 15, 2013.
Open Mobile Alliance (OMA); http://openmobilealliance.org/, as accessed Jun. 25, 2015; Aug. 2, 2002.
OpenHAB; http://www.openhab.org/, as accessed Jun. 25, 2015; Jul. 11, 2011.
Daniel Siewiorek; SenSay: A Context-Aware Mobile Phone; Human Computer Interaction and Institute for Complex Engineered Systems; as accessed on Sep. 10, 2012.
Megan Treacy; 10 environmental sensors that go along with you; http://www.treehugger.com/clean-technology/environmental-sensors.html, as accessed Jun. 25, 2015; Mar. 5, 2013.
Zenprise; Mobile DLP (Data Leakage Prevention); http://www.zenprise.com/solutions/mobile-data-leakage-prevention/, as accessed on Sep. 10, 2012.
Alastair R. Beresford et al., MockDroid: trading privacy application functionality on smartphones; Proceedings of the 12th Workshop on Mobile Computing Systems and Applications, HotMobile '11, Phoenix, Arizona, Mar. 1-3, 2011.
Jason Franklin et al.; Passive Data Link Layer 802.11 Wireless Device Driver Fingerprinting; Proceedings of USENIX Security '06, Jul. 31-Aug. 4, 2006, Vancouver, BC, Canada.
School of Privacy, Guide on How to be Safe, Secure and Protect Your Online Anonymity; Fake GPS Location—Android; http://school-of-privacy.com/post/70381068300/fake-gps-location-andoid; Dec. 18, 2013.
SensorSimulator; https://code.google.com/p/openintents/wiki/SensorSimulator; Jan. 12, 2013.
William E. Sobel, et al.; Systems and Methods for Introducing Variation in Sub-System Output Signals to Prevent Device Fingerprinting; U.S. Appl. No. 14/139,824, filed Dec. 23, 2013.
Ramakrishnan Meenakshi Sundaram; Systems and Methods for Managing Smart Building Systems; U.S. Appl. No. 15/041,002, filed Feb. 10, 2016.
ZigBee Alliance, http://www.zigbee.org/, as accessed Dec. 14, 2015, (Nov. 14, 2001).
Z-Wave, http://www.z-wave.com/, as accessed Dec. 14, 2015, (Dec. 23, 2002).
OMA Device Management Working Group, http://openmobilealliance.org/about-oma/work-program/device-management/, as accessed Dec. 14, 2015, (Jan. 15, 2013).
Lei Gu, et al; Systems and Methods for Enforcing Access-Control Policies in an Arbitrary Physical Space; U.S. Appl. No. 15/195,677, filed Jun. 28, 2016.
Bruce McCorkendale; Systems and Methods for Authenticating Users; U.S. Appl. No. 14/834,949, filed Aug. 25, 2015.
Home—Good Security Questions; http://goodsecurityquestions.com/, as accessed Jun. 25, 2015, (Dec. 27, 2007).
Kevin Jiang, et al; Systems and Methods for Using Vehicles as Information Sources for Knowledge-Based Authentication; U.S. Appl. No. 14/979,620, filed Dec. 28, 2015.
Snapshot; https://www.progressive.com/auto/snapshot/, as accessed Nov. 18, 2015; Progressive Casualty Insurance Company; on or before Nov. 18, 2015.
FasTrak; https://www.bayareafastrak.org/en/howitworks/gettingstarted.shtml, as accessed Nov. 18, 2015; on or before Nov. 18, 2015.
Ilya Sokolov, et al; Systems and Methods for Verifying User Attributes; U.S. Appl. No. 14/985,675, filed Dec. 31, 2015.
E-ZPass, https://www.e-zpassny.com/en/home/index.shtml, as accessed Nov. 18, 2015, (on or before Nov. 18, 2015).
Fastpass, https://disneyland.disney.go.com/guest-services/fastpass/, as accessed Nov. 18, 2015, Disney, (on or before Nov. 18, 2015).
Toll Payment Options at the Golden Gate Bridge, http://www.goldengate.org/tolls/tollpaymentoptions.php, as accessed Nov. 18, 2015, (on or before Nov. 18, 2015).
OnStar, https://www.onstar.com/us/en/home.html, as accessed Nov. 18, 2015, (on or before Nov. 18, 2015).
BMW Assist, http://www.bmwusa.com/Standard/Content/Explore/BMWValue/BMWAssist/default.aspx, as accessed Nov. 18, 2015, (on or before Nov. 18, 2015).
Department of Motor Vehicles, https://www.dmv.ca.gov/portal/dmv, as accessed Nov. 18, 2015, (on or before Nov. 18, 2015).

(56) References Cited

OTHER PUBLICATIONS

Ilya Sokolov, et al; Systems and Methods for Evaluating Identity Intensity; U.S. Appl. No. 15/057,618, filed Mar. 1, 2016.
Evgenios Kornaropoulos, et al; Systems and Methods for Securely Detecting Data Similarities; U.S. Appl. No. 14/871,868, filed Sep. 30, 2015.
Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).
Ilya Sokolov et al; Systems and Methods for Certifying Geolocation Coordinates of Computing Devices; U.S. Appl. No. 15/466,156, filed Mar. 22, 2017.
Ilya Sokolov et al.; Systems and Methods for Securely Sharing Cloud-Service Credentials Within a Network of Computing Devices; U.S. Appl. No. 15/276,105, filed Sep. 26, 2016.
Amazon Echo, Nov. 6, 2014: https://en.wikipedia.org/wiki/Amazon_Echo.
Google Home, announced May 18, 2016: https://en.wikipedia.org/wiki/Google_Home.
Secret sharing, as accessed on Sep. 13, 2016: https://en.wikipedia.org/wiki/Secret_sharing.
Norton Identity Safe, announced Aug. 28, 2007: https://identitysafe.norton.com/.
Abadi et al., "Traffic Flow Predicition for Road Transporation Networks with Limited Traffic Data", IEEE Transactions on Intelligent Transportation Systems, vol. 16, No. 2, Apr. 2015, pp. 653-662.
Baek et al, "An Authentication Framework for Automatic Dependent Surveilliance-Broadcast Based on Online/Offline Identity-Based Signature", 2013 Eighth International Conference on P2P, Parallel, Grid, Cloud and Internet Computing, 2013, pp. 358-363.
Buhrmann et al., "Mobile Wallet Security", U.S. Appl. No. 61/591,232, filed Jan. 26, 2012, 18 pages.
Salem et al., "Adaptive Risk-Based Access Controls", U.S. Appl. No. 61/602,427, filed Feb. 23, 2012, 17 pages.
Temple, James, "Accelerometer IDs smartphones in seconds", SFGATE, URL: http://www.sfgate.com/technology/dotcommentary/article/accelerometer-IDs-smartphone-in-seconds-4885711.php, Oct. 10, 2013, 6 pages.
International Search Report and Written Opinion received for International Patent Application Serial No. PCT/US2013/078319 dated Apr. 16, 2014, 7 pages.
International Search Report and Written Opinion received for International Patent Application Serial No. PCT/US2014/071791 dated Mar. 19, 2015, 8 pages.

\* cited by examiner

SYSTEMS AND METHODS FOR FACILITATING SINGLE SIGN-ON FOR MULTIPLE DEVICES

BACKGROUND

Information security has been a concern of computing professionals throughout the history of computing. An entire industry has emerged to address the issues associated with providing access to computing resources only to authorized users. As the number and type of computing devices continue to grow, users are increasingly burdened with the need to authenticate to each device they use. For example, a user may have a desktop computer, a laptop computer, a tablet computer, and a smartphone, each of which requires the user to undergo a sign-on process. This trend is only likely to continue as new varieties of computing devices emerge. For example, the Internet of Things (IoT) initiative promises to multiply the number of connected smart devices associated with each user. Sensors and monitors may collect data that control devices may need to access. Ideally, the data would be stored where it is accessible to any of the user's devices that may utilize the data, but with access permitted only to authorized devices.

The need for secure, accessible data storage is addressed by another trend that affects the information security landscape—cloud computing. With cloud computing, users often need to authenticate each of several devices to obtain access to the same set of cloud-based programs and data. Accordingly, the instant disclosure identifies and addresses a need for additional and improved systems and methods for facilitating single sign-on for multiple devices.

SUMMARY

As will be described in greater detail below, the instant disclosure describes various systems and methods for facilitating single sign-on for multiple devices by establishing a login session for a user account and storing a session token representing the login session on a device (such as a tablet or smartphone) associated with the user account. As the user requests access to resources associated with the user account, access to the resources may be granted as long as the session token is present on the associated device, without the need to reauthenticate to the user account.

In one example, a computer-implemented method for facilitating single sign-on for multiple devices may include (1) establishing a login session for a user account, (2) in response to establishing the login session, providing, to a device associated with the user account, a session token for the user account, (3) receiving, from at least one client, a request to access resources associated with the user account, (4) determining that the associated device possesses the session token for the user account, and (5) in response to determining that the associated device possesses the session token, providing, to the client, access to the resources associated with the user account.

In some examples, establishing the login session for the user account occurs in response to receiving a request to access the resources associated with the user account. In some examples, the computer-implemented method may further include applying an authentication policy before providing access to the resources associated with the user account, where the authentication policy may include (1) displaying, on the associated device, a notification that the request to access the resources associated with the user account has been received, (2) displaying, on the associated device, information identifying the client requesting access to the resources associated with the user account, (3) obtaining, via the associated device, permission to access the resources associated with the user account, and/or (4) authenticating the user account using authentication factors obtained via the associated device.

In one embodiment, the computer-implemented method may further include receiving, from the client, a request to terminate the login session for the user account and, in response to receiving the request to terminate the login session, terminating the login session by removing the session token for the user account from the associated device. In one embodiment, establishing the login session for the user account may include determining that the associated device is connected to the client via a proximity channel and authenticating the user account on the associated device. In such embodiments, providing access to the resources associated with the user account may include authenticating the client to at least one service by using an agent on the associated device as a proxy for the client.

In one embodiment, the proximity channel may be a Bluetooth connection, a near field communication connection, a local network, and/or a personal area network. In one embodiment, the computer-implemented method may further include determining that the associated device is no longer connected to the client and, in response to determining that the associated device is no longer connected to the client, terminating the login session by removing the session token for the user account from the associated device.

In one embodiment, a system for implementing the above-described method may include several modules stored in memory, such as (1) a sign-on module that establishes a login session for a user account, (2) a session module that, in response to establishing the login session, provides, to a device associated with the user account, a session token for the user account, (3) a communication module that receives, from at least one client, a request to access resources associated with the user account, (4) a verification module that determines that the associated device possesses the session token for the user account, and (5) an access module that, in response to determining that the associated device possesses the session token, provides, to the client, access to the resources associated with the user account. The system may also include at least one physical processor configured to execute the sign-on module, the session module, the communication module, the verification module, and the access module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) establish a login session for a user account, (2) in response to establishing the login session, provide, to a device associated with the user account, a session token for the user account, (3) receive, from at least one client, a request to access resources associated with the user account, (4) determine that the associated device possesses the session token for the user account, and (5) in response to determining that the associated device possesses the session token, provide, to the client, access to the resources associated with the user account.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
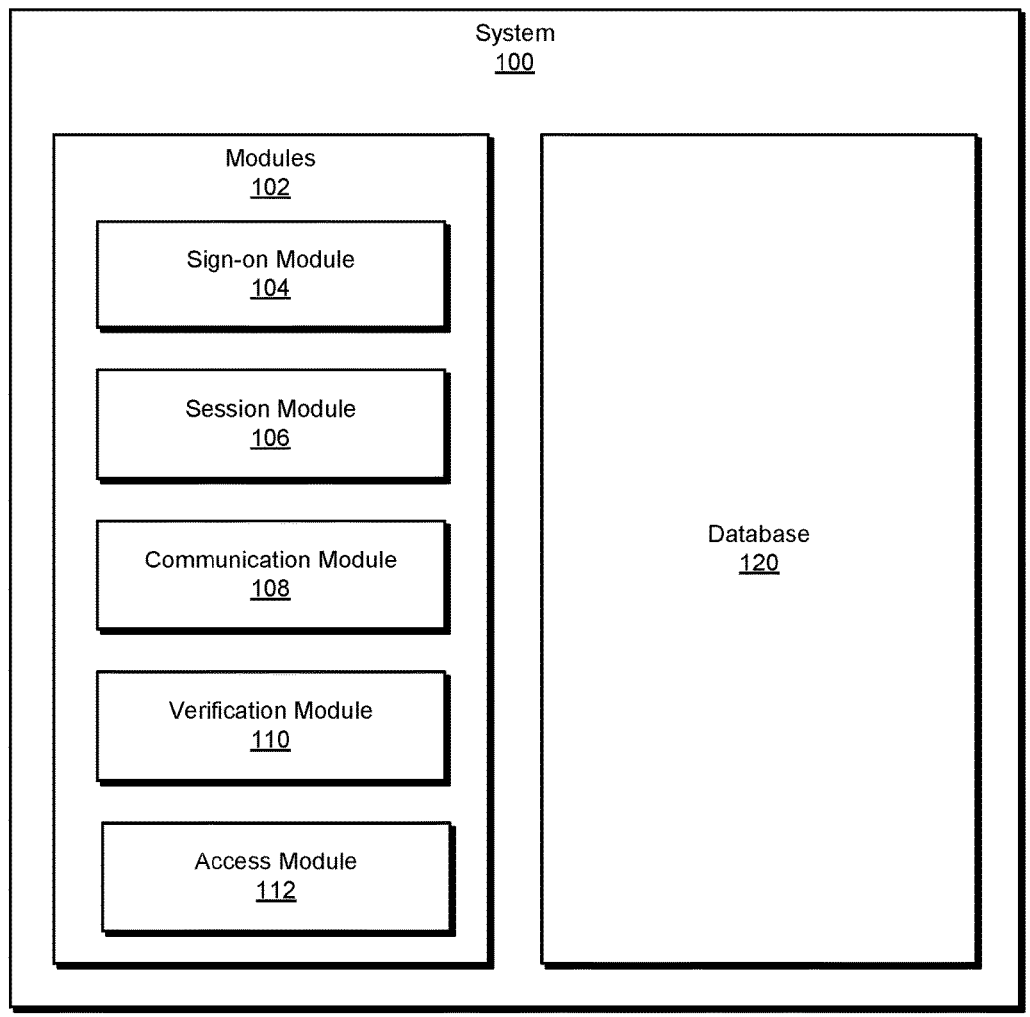
FIG. 1 is a block diagram of an exemplary system for facilitating single sign-on for multiple devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for facilitating single sign-on for multiple devices. As will be explained in greater detail below, the systems and methods described herein may establish a login session for a user account and indicate that the login session has been established by providing a session token to a device associated with the user account. As clients request access to resources associated with the user account, the systems and methods described herein may, based on the presence of the session token on the associated device, determine that a login session has been established and that the client may access the resources associated with the user account.

Figure 2:
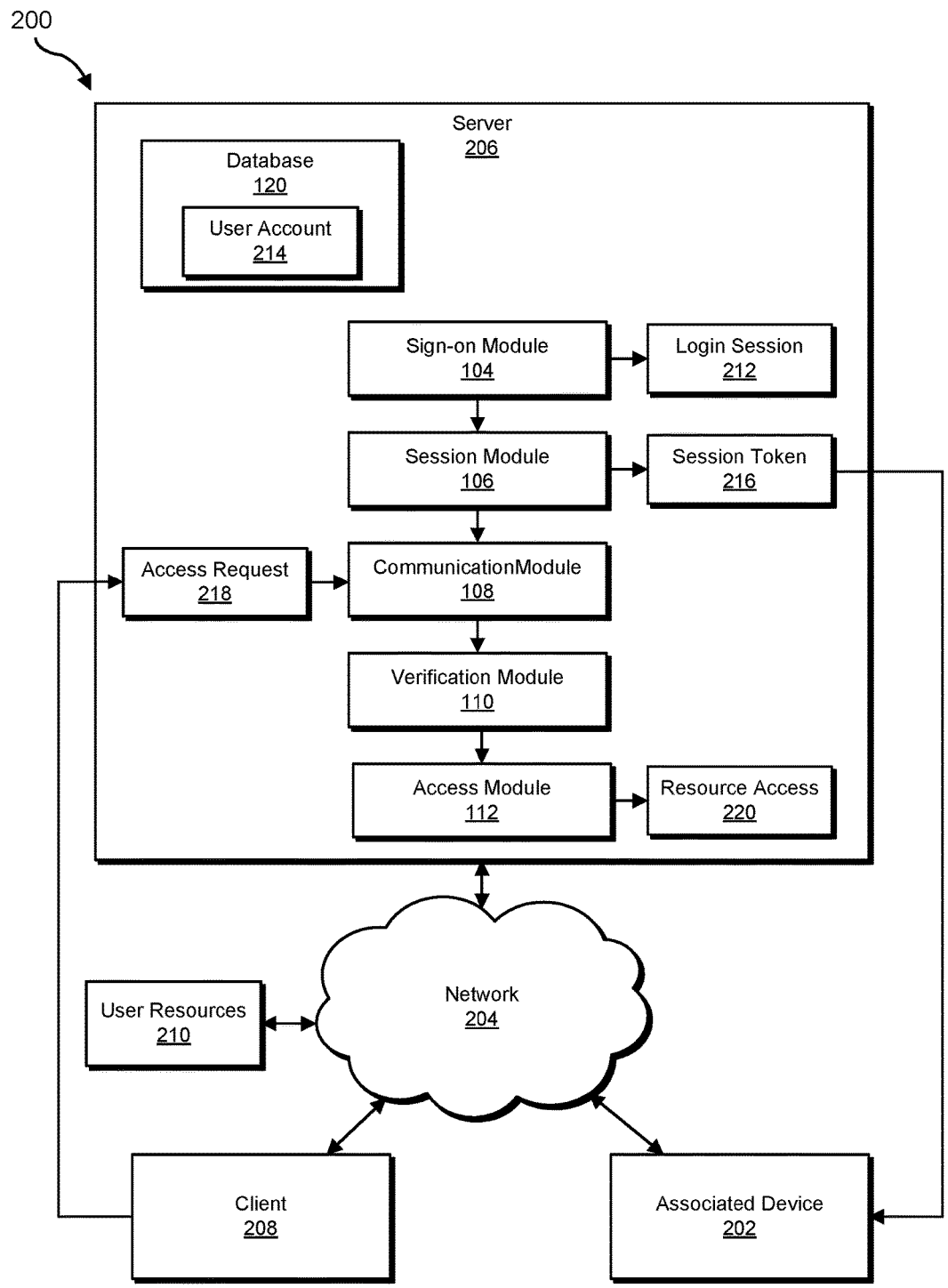
FIG. 2 is a block diagram of an additional exemplary system for facilitating single sign-on for multiple devices.
Figure 3:
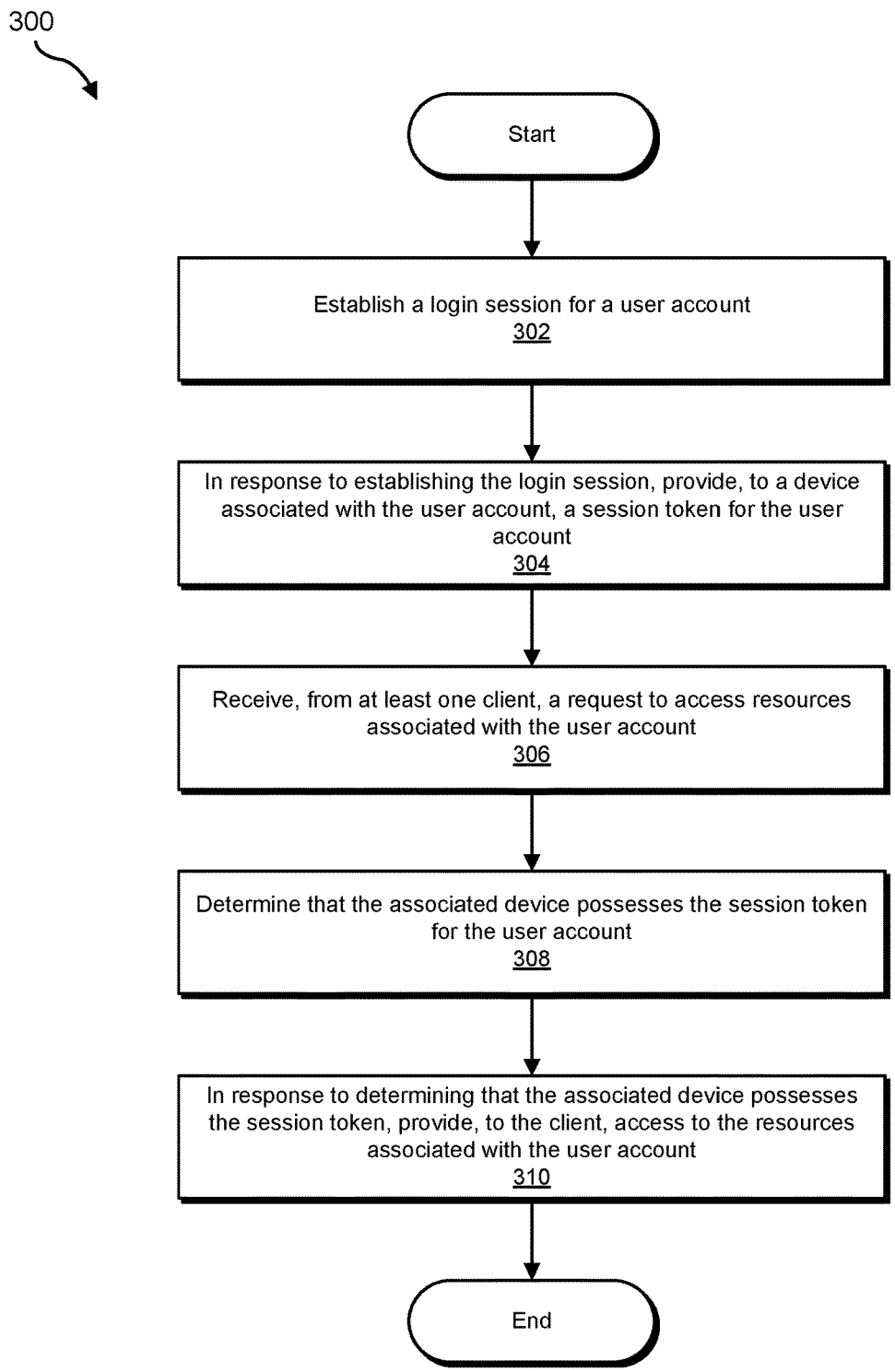
FIG. 3 is a flow diagram of an exemplary method for facilitating single sign-on for multiple devices.
Figure 4:
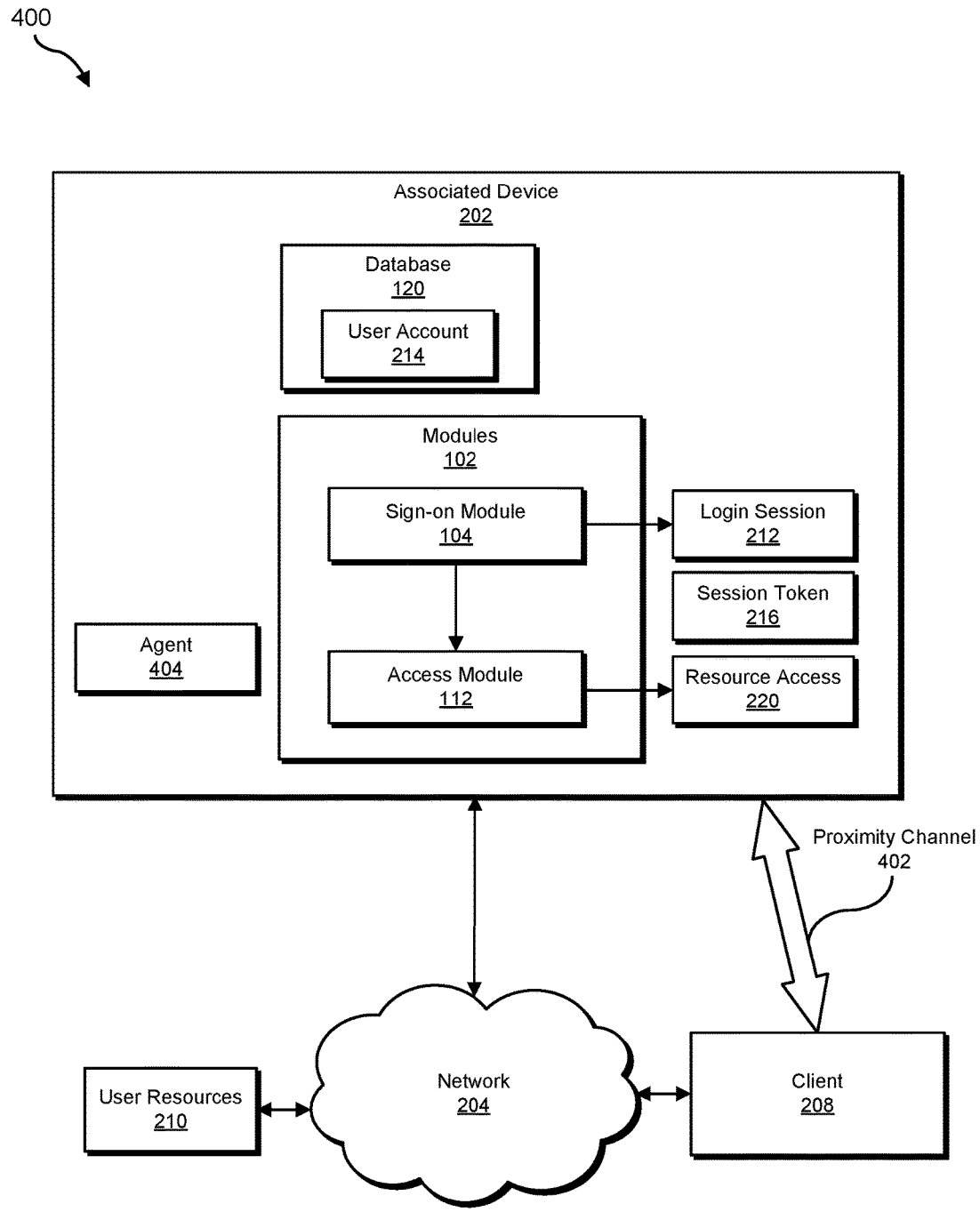
FIG. 4 is a block diagram of an additional exemplary system for facilitating single sign-on for multiple devices.

The following will provide, with reference to FIGS. 1, 2, and 4 detailed descriptions of exemplary systems for facilitating single sign-on for multiple devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for facilitating single sign-on for multiple devices. As illustrated in this figure, exemplary system 100 may include one or more modules 102 for performing one or more tasks. For example, and as will be explained in greater detail below, exemplary system 100 may include a sign-on module 104 that establishes a login session for a user account. Exemplary system 100 may additionally include a session module 106 that, in response to establishing the login session, provides a session token for the user account to a device associated with the user account. Exemplary system 100 may also include a communication module 108 that receives, from at least one client, a request to access resources associated with the user account. Exemplary system 100 may additionally include a verification module 110 that determines that the associated device possesses the session token for the user account. Exemplary system 100 may also include an access module 112 that, in response to determining that the associated device possesses the session token, provides, to the client, access to the resources associated with the user account. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., associated device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store user account information, such as user IDs and credentials in encrypted form. Database 120 may represent portions of a single database or computing device or a plurality of databases or computing devices. For example, database 120 may represent a portion of server 206 in FIG. 2, associated device 202 in FIG. 4, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, associated device 202 in FIG. 4, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include an associated device 202 in communication with a server 206, client 208, and user resources 210 via a network 204. In one example, associated device 202 and/or client 208 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of associated device 202, server 206, and/or client 208, enable associated device 202, server 206, and/or client 208 to facilitate single sign-on for multiple devices. For example, and as will be described in greater detail below, sign-on module 104 may establish a login session 212 for a user account 214. Session module 106 may, in response to establishing login session 212, provide a session token 216 for user account 214 to a device associated with user account 214. Communication module 108 may receive, from at least one client 208, an access request 218 to access user resources 210 associated with user account 214. Verification module 110 may determine that associated device 202 possesses session token 216 for user account 214. Access module 112 may, in response to determining that associated device 202 possesses session token 216, provide, to client 208, access to user resources 210 associated with user account 214.

Associated device 202 and client 208 generally represent any type or form of computing device capable of reading computer-executable instructions. Examples of associated device 202 and client 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of receiving, storing, comparing, and transmitting data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between associated device 202 and server 206.

FIG. 3 is a flow diagram of an exemplary computer-implemented method 300 for facilitating single sign-on for multiple devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, computing system 510 in FIG. 5, and/or portions of exemplary network architecture 600 in FIG. 6.

As illustrated in FIG. 3, at step 302, one or more of the systems described herein may establish a login session for a user account. For example, sign-on module 104 may, as part of server 206 in FIG. 2, establish login session 212 for user account 214.

Sign-on module 104 may establish a login session for a user account in a variety of ways. For example, sign-on module 104 may execute on a web server that receives login requests from users to access services provided by the web server. Alternatively, sign-on module 104 may be part of a user authentication service that operates separately from the web server. In some examples, sign-on module 104 may establish a login session for a user account only after receiving and authenticating user credentials such as a user name and password, biometrics, answers to challenge questions, etc.

In some examples, sign-on module 104 may establish the login session for the user account occurs in response to receiving a request to access the resources associated with the user account. For example, sign-on module 104 may, as part of server 206 in FIG. 2, initiate login session 212 after receiving a request from client 208 or associated device 202 to access user resources 210.

At step 304, one or more of the systems described herein may provide, in response to establishing the login session, a session token for the user account to a device associated with the user account. For example, session module 106 may, as part of server 206 in FIG. 2, provide, in response to establishing login session 212, session token 216 for user account 214 to associated device 202 that is associated with user account 214.

The term "associated device," as used herein, generally refers to a device associated with a user account that is expected to be accessible to the user and/or someone authorized to control access to the user account. Examples of associated devices include, without limitation, a mobile phone or tablet computer that is expected to remain in the user's possession. The user may be asked to identify an associated device when the user account is created or when providing authentication credentials to be associated with the account. The term "session token," as used herein, generally refers to a value or data structure that may be used to verify that a user has established a login session for a user account. For example, a session token may be a data structure that includes a randomly generated value and hashed IP addresses for devices that have been authorized to share the login session.

Session module 106 may provide a session token to an associated device in a variety of ways. For example, session module 106 may store the session token in an operating system registry or in a file in a known location on associated device 202. In another example, session module 106 may provide a session token to a software agent executing on associated device 202.

At step 306, one or more of the systems described herein may receive, from one or more clients, a request to access resources associated with the user account. For example, communication module 108 may, as part of server 206 in FIG. 2, receive, from client 208, access request 218 to access user resources 210 associated with user account 214.

The terms "resources" or "user resources," as used herein, generally refer to any physical or virtual component to which access is restricted. Examples of resources may include, without limitation, programs, data, memory, secondary storage, computing devices, peripheral devices, and/or any other resource that may be associated with a user account.

Communication module 108 may receive a request to access resources associated with a user account in a variety of ways. For example, communication module 108 may, as part of server 206 in FIG. 2, receive a request to access web services provided by server 206 from a web browser running on client 208. Communication module 108 may receive access request 218 for a user account that has already established a login session with the server or, as described in connection with step 302 above, communication module 108 may receive access request 218 for a user account that has not yet established a login session.

At step 308, one or more of the systems described herein may determine that the associated device possesses the session token for the user account. For example, verification module 110 may, as part of server 206 in FIG. 2, determine that associated device 202 possesses session token 216 for user account 214.

Verification module 110 may determine that the associated device possesses the session token in a variety of ways. For example, verification module 110 may retrieve the session token from an operating system registry or file on the associated device. In another example, verification module 110 may communicate with a software agent executing on the associated device to obtain the session token. After obtaining the session token, verification module 110 may determine whether the client has been authorized to access user resources associated with the user account, for example, by hashing the IP address of the client requesting access to user resources and comparing the hash value to hash values stored with the session token.

In one embodiment, systems described herein may receive, from the client, a request to terminate the login session for the user account and in response to receiving the request to terminate the login session, terminate the login session by removing the session token for the user account from the associated device. For example, as part of server 206 in FIG. 2, communication module 108 may receive a request to terminate login session 212 from client 208. Session module 106 may then terminate login session 212 by removing session token 216 from associated device 202.

In another example, communication module 108 may receive a request from client 208 to revoke the client's authorization to share the login session without terminating the login session for all authorized devices. Session module 106 may then revoke the client's authorization to share the login session by removing a data entry identifying the client from the session token stored on associated device 202.

At step 310, one or more of the systems described herein may, in response to determining that the associated device possesses the session token, provide, to the client, access to the resources associated with the user account. For example, access module 112 may, as part of server 206 in FIG. 2, in response to determining that associated device 202 possesses session token 216, provide to client 208 resource access 220 to user resources 210 associated with user account 214.

Access module 112 may provide access to the resources associated with the user account in a variety of ways. For example, access module 112 may, as part of a web server, create a session ID for the client and provide a cookie to the web browser running on the client to identify the session in transmissions between the client and web server. In another example, access module 112 may establish a connection between the client and server to be used with connection-oriented communication (such as SSL/TLS) between the client and server. In another example, access module 112 may be part of an authentication service that, in response to determining that the associated device possesses the session token, notifies the server that the client has been authenticated to the user account and should therefore be granted access to the resources associated with the account.

In some examples, systems described herein may apply an authentication policy, for example, to authenticate the identity of the user and/or verify that the user is authenticating from an authorized device before providing access to the resources associated with the user account. The authentication policy may vary depending on such factors as the location or type of device from which the user is authenticating, the type of resources for which the user is requesting access, or the desired security level. An authentication policy may, for example, specify that the associated device should display a notification that a request to access the resources associated with the user account has been received. In another example, an authentication policy may specify that the associated device should display information identifying the client requesting access to the resources associated with the user account, such as the client's location or IP address. An authentication policy may also direct the associated device to obtain permission to access the resources associated with the user account or obtain additional authentication factors that may be used to authenticate the client to the user account.

In one embodiment, sign-on module 104 may establish the login session for the user account by determining that the associated device is connected to the client via a proximity channel and authenticating the user account on the associated device. Additionally, access module 112 may provide access to the resources associated with the user account by authenticating the client to one or more services by using an agent on the associated device as a proxy for the client.

The term "proximity channel," as used herein, generally refers to a communication channel that operates over a limited range. For example, proximity channels may operate in an area ranging from a few inches to several feet. Proximity channels may include, without limitation, Bluetooth connections, near field communication connections, local networks, and/or personal area networks.

FIG. 4 is a block diagram of a system 400 for facilitating single sign-on for multiple devices. System 400 may include components of system 200 in FIG. 2, such as associated device 202, network 204, client 208, and user resources 210. Associated device 202 may include database 120 and modules 102. Additionally, system 400 may include agent 404 and proximity channel 402 that connects client 208 to associated device 202. As illustrated in FIG. 4, sign-on module 104 may, as part of associated device 202 in FIG. 4, use proximity channel 402 to determine that the associated device is in close physical proximity to the client. Sign-on module 104 may then authenticate the user on associated device 202 to establish login session 212. As described in greater detail above, sign-on module 104 may apply an authentication policy in authenticating the user that may, depending on considerations such as the type of user resources 210 to which the user has requested access or the desired security level, request that the user provide credentials for user account 214 or additional authentication factors.

After sign-on module 104 has authenticated the user, access module 112 may, as part of associated device 202 in FIG. 4, use agent 404 as a proxy for client 208 to provide access to user resources 210. In one embodiment, agent 404 may act as a proxy for a browser running on client 208 in authenticating to a server that supports the MICROSOFT WINDOWS authentication scheme to control access to user resources 210. Agent 404 may issue requests for access to user resources 210 on behalf of client 208 and respond to challenges from the web server with tokens obtained from client 208 according to the authentication scheme. When agent 404 has established a login session with the web server, agent 404 may receive a session ID from the server and provide the session ID to client 208, indicating that the login session has been established. Client 208 may then use the session ID to communicate with the server when accessing user resources 210.

In one embodiment, systems described herein may determine that the associated device is no longer connected to the client and in response to determining that the associated device is no longer connected to the client, terminate the login session by removing the session token for the user account from the associated device. For example, sign-on module 102 may, as part of associated device 202 in FIG. 4, determine that associated device 202 is no longer connected to client 208 on proximity channel 402. Sign-on module 104 may then terminate login session 212 by removing session token 216 from associated device 202.

As described in greater detail above, the systems and methods described herein may facilitate single sign-on for multiple devices by establishing a login session for a user account and indicate that the login session has been established by providing a session token to a device associated with the user account. When a client requests access to resources associated with the user account, the systems and methods described herein may verify that the session token is present on the associated device and therefore the client should be permitted to access the resources. The systems and methods described herein may establish the login session after determining that the associated device is connected to a client via a proximity channel. The systems and methods described herein may then provide access to the user resources by authenticating the client to one or more services using an agent on the associated device as a proxy for the client.

Figure 5:
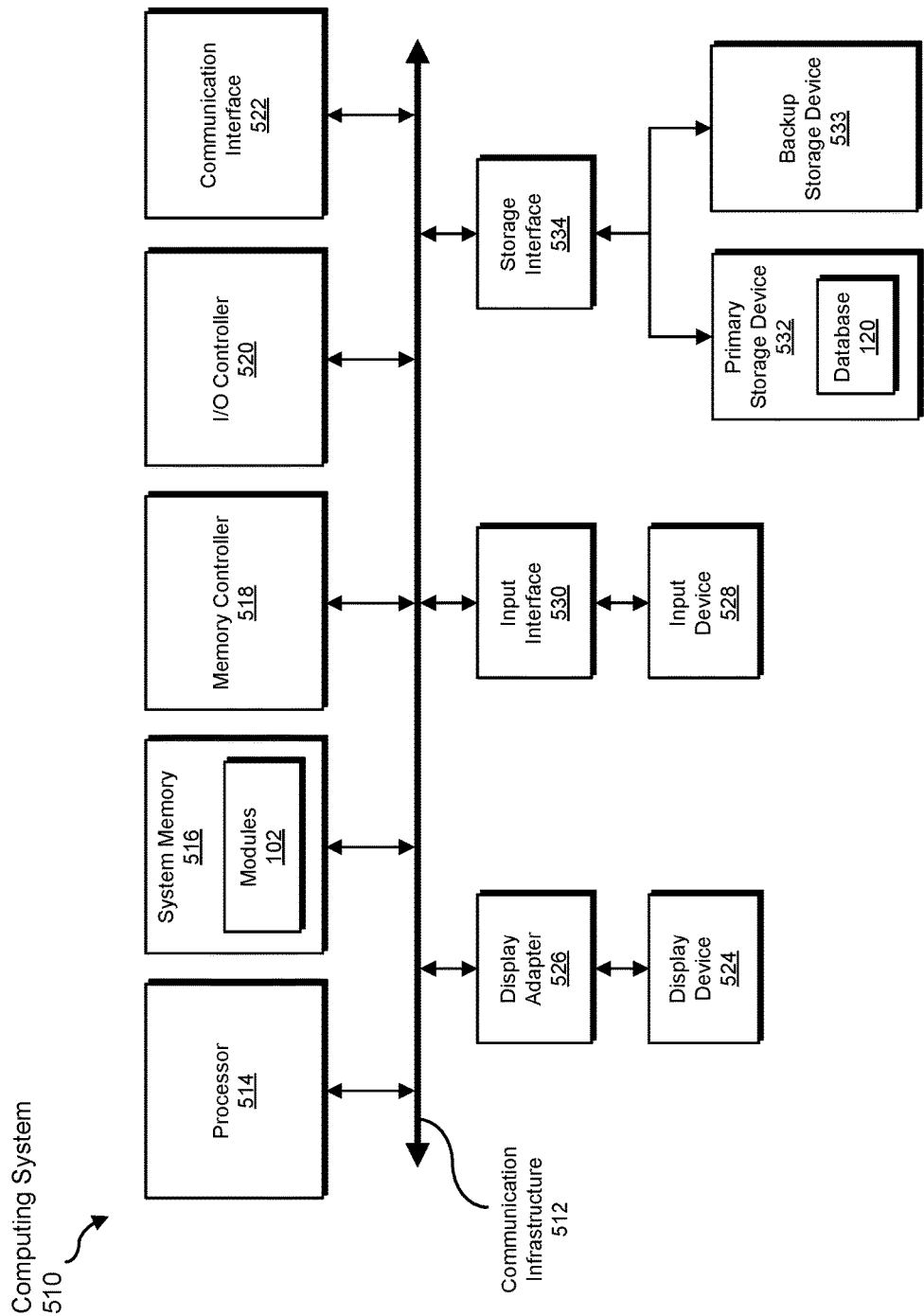
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
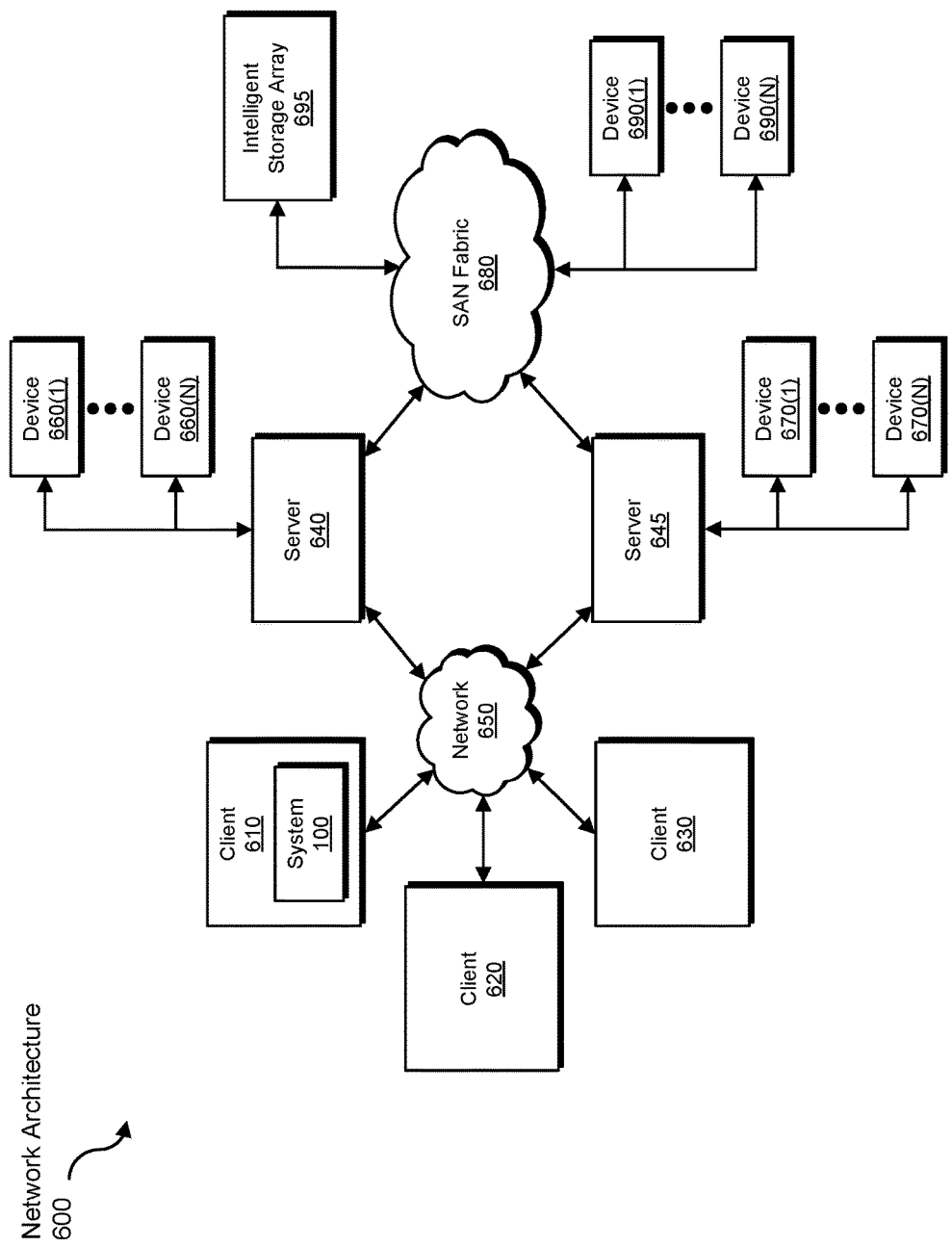
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for facilitating single sign-on for multiple devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive user account data to be transformed, transform the user account data, output a result of the transformation to provide a session token for the user account, use the result of the transformation to verify that a login session has been established, and store the result of the transformation to facilitate single-sign-on for multiple devices. Additionally or alternatively, one or more of the modules recited herein may transform one or more devices into a system for facilitating single sign-on for multiple devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for facilitating single sign-on for multiple devices, at least a portion of the method being performed by a computing device comprising at least one processor, the method comprising:
    establishing a login session for a user account, wherein establishing the login session comprises:
        determining that a device associated with the user account is connected to a client via a proximity channel; and
        authenticating a user of the client on the associated device;
    in response to establishing the login session, providing, to the associated device, a session token for the user account;
    receiving, from the client, a request to access resources associated with the user account, wherein the client has not received the session token for the user account;
    determining that the associated device possesses the session token for the user account; and
    in response to determining that the associated device possesses the session token, providing, to the client, access to the resources associated with the user account, wherein providing access to the resources associated with the user account comprises authenticating the client to at least one service by using an agent on the associated device as a proxy for the client.

2. The computer-implemented method of claim 1, wherein establishing the login session for the user account occurs in response to receiving a request to access the resources associated with the user account.

3. The computer-implemented method of claim 1, further comprising applying an authentication policy before providing access to the resources associated with the user account, wherein the authentication policy comprises at least one of:
    displaying, on the associated device, a notification that the request to access the resources associated with the user account has been received;
    displaying, on the associated device, information identifying the client requesting access to the resources associated with the user account;
    obtaining, via the associated device, permission to access the resources associated with the user account; or
    authenticating the user account using authentication factors obtained via the associated device.

4. The computer-implemented method of claim 1, further comprising:
    receiving, from the client, a request to terminate the login session for the user account; and
    in response to receiving the request to terminate the login session, terminating the login session by removing the session token for the user account from the associated device.

5. The computer-implemented method of claim 1, wherein:
    receiving, from the client, the request to access resources associated with the user account comprises:

receiving the request at the associated device; and
issuing, by the agent, a corresponding request to a web server; and
authenticating the client to the at least one service comprises:
responding, using the agent, to challenges from the web server.

6. The computer-implemented method of claim 1, wherein the proximity channel is at least one of:
a Bluetooth connection;
a near field communication connection;
a local network; or
a personal area network.

7. The computer-implemented method of claim 1, further comprising:
determining that the associated device is no longer connected to the client; and
in response to determining that the associated device is no longer connected to the client, terminating the login session by removing the session token for the user account from the associated device.

8. A system for facilitating single sign-on for multiple devices, the system comprising:
a sign-on module, stored in memory, that establishes a login session for a user account wherein establishing the login session comprises:
determining that a device associated with the user account is connected to a client via a proximity channel; and
authenticating a user of the client on the associated device;
a session module, stored in memory, that, in response to establishing the login session, provides, to the associated device, a session token for the user account;
a communication module, stored in memory, that receives, from the client, a request to access resources associated with the user account, wherein the client has not received the session token for the user account;
a verification module, stored in memory, that determines that the associated device possesses the session token for the user account;
an access module, stored in memory, that, in response to determining that the associated device possesses the session token, provides, to the client, access to the resources associated with the user account, wherein providing access to the resources associated with the user account comprises authenticating the client to at least one service by using an agent on the associated device as a proxy for the client; and
at least one physical processor configured to execute the sign-on module, the session module, the communication module, the verification module, and the access module.

9. The system of claim 8, wherein the sign-on module establishes the login session for the user account in response to receiving a request to access the resources associated with the user account.

10. The system of claim 8, wherein the verification module applies an authentication policy before providing access to the resources associated with the user account, by at least one of:
displaying, on the associated device, a notification that the request to access the resources associated with the user account has been received;
displaying, on the associated device, information identifying the client requesting access to the resources associated with the user account;
obtaining, via the associated device, permission to access the resources associated with the user account; or
authenticating the user account using authentication factors obtained via the associated device.

11. The system of claim 8, wherein:
the communication module receives, from the client, a request to terminate the login session for the user account; and
in response to receiving the request to terminate the login session, the session module terminates the login session by removing the session token for the user account from the associated device.

12. The system of claim 8, wherein:
the communication module receives, from the client, the request to access resources associated with the user account by:
receiving the request at the associated device; and
issuing, by the agent, a corresponding request to a web server; and
the access module authenticates the client to the at least one service by:
responding, using the agent, to challenges from the web server.

13. The system of claim 8, wherein the proximity channel is at least one of:
a Bluetooth connection;
a near field communication connection;
a local network; or
a personal area network.

14. The system of claim 8, wherein:
the sign-on module determines that the associated device is no longer connected to the client; and
the session module, in response to determining that the associated device is no longer connected to the client, terminates the login session by removing the session token for the user account from the associated device.

15. A non-transitory computer-readable medium comprising one or more computer-readable instructions that, when executed by at least one processor of a computing device, cause the computing device to:
establish a login session for a user account, wherein establishing the login session comprises:
determining that a device associated with the user account is connected to a client via a proximity channel; and
authenticating a user of the client on the associated device;
in response to establishing the login session, provide, to the associated device, a session token for the user account;
receive, from the client, a request to access resources associated with the user account, wherein the client has not received the session token for the user account;
determine that the associated device possesses the session token for the user account; and
in response to determining that the associated device possesses the session token, provide, to the client, access to the resources associated with the user account, wherein providing access to the resources associated with the user account comprises authenticating the client to at least one service by using an agent on the associated device as a proxy for the client.

16. The non-transitory computer-readable medium of claim 15, wherein the one or more computer-readable instructions cause the computing device to establish the login session for the user account in response to receiving a request to access the resources associated with the user account.

17. The non-transitory computer-readable medium of claim 15, wherein the one or more computer-readable instructions cause the computing device to apply an authentication policy before providing access to the resources associated with the user account, by at least one of:
- displaying, on the associated device, a notification that the request to access the resources associated with the user account has been received;
- displaying, on the associated device, information identifying the client requesting access to the resources associated with the user account;
- obtaining, via the associated device, permission to access the resources associated with the user account; or
- authenticating the user account using authentication factors obtained via the associated device.

18. The non-transitory computer-readable medium of claim 15, wherein the one or more computer-readable instructions cause the computing device to:
- receive, from the client, a request to terminate the login session for the user account; and
- in response to receiving the request to terminate the login session, terminate the login session by removing the session token for the user account from the associated device.

19. The non-transitory computer-readable medium of claim 15, wherein the one or more computer-readable instructions cause the computing device to:
- receiving, from the client, the request to access resources associated with the user account comprises:
  - receiving the request at the associated device; and
  - issuing, by the agent, a corresponding request to a web server; and
- authenticating the client to the at least one service comprises:
  - responding, using the agent, to challenges from the web server.

20. The non-transitory computer-readable medium of claim 15, wherein the proximity channel is at least one of:
- a Bluetooth connection;
- a near field communication connection;
- a local network; or
- a personal area network.

* * * * *

UNITED STATES PATENT AND TRADEMARK OFFICE
CERTIFICATE OF CORRECTION

| | | |
|---|---|---|
| PATENT NO. | : 10,326,733 B2 | Page 1 of 1 |
| APPLICATION NO. | : 15/041040 | |
| DATED | : June 18, 2019 | |
| INVENTOR(S) | : Prasad Bokare et al. | |

It is certified that error appears in the above-identified patent and that said Letters Patent is hereby corrected as shown below:

On the Title Page

Column 1, below "US 2017/0195429 A1 Jul. 6, 2017" insert -- (30) Foreign Application Priority Data Dec. 30, 2015 (IN) 4962/MUM/2015 --, therefor.

In the Claims

Column 17, Line 25, Claim 8, delete "user account" and insert -- user account, --, therefor.

Signed and Sealed this
Twentieth Day of August, 2019

Andrei Iancu
*Director of the United States Patent and Trademark Office*